Aug. 28, 1951  H. H. ARNOLD  2,565,542
PEAK READING VACUUM TUBE VOLTMETER
Filed Aug. 13, 1948
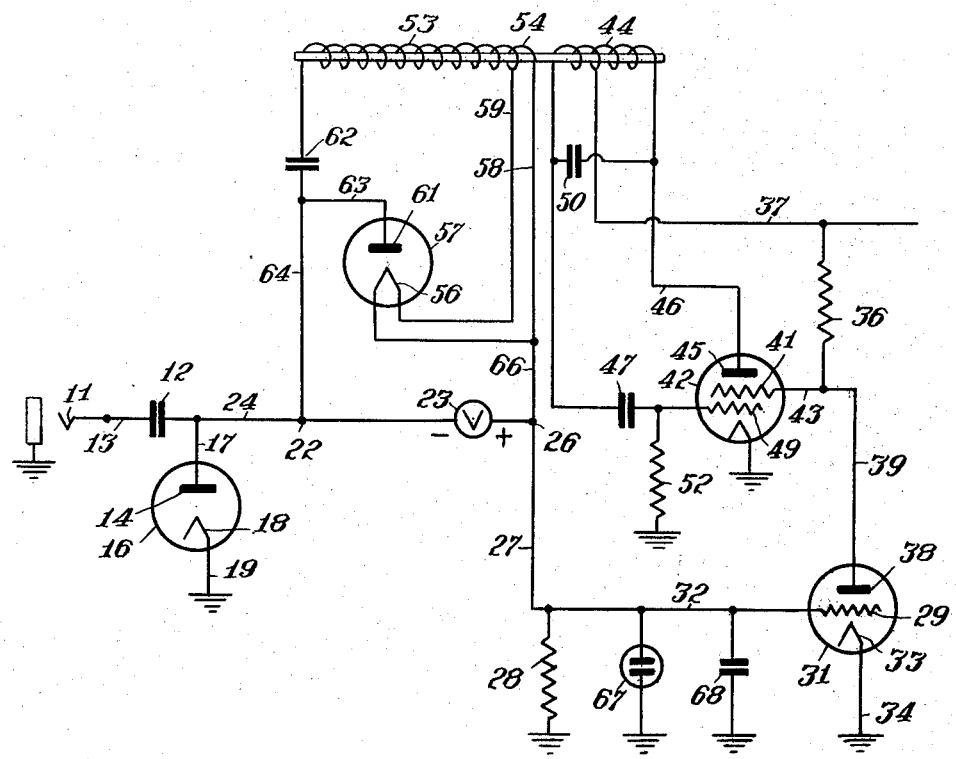
Inventor
*Howard H. Arnold*
By *C. B. Hamilton,*
Attorney Patented Aug. 28, 1951

2,565,542

UNITED STATES PATENT OFFICE 2,565,542

PEAK READING VACUUM TUBE VOLTMETER

Howard H. Arnold, Winston-Salem, N. C., assignor to Western Electric Company, Incorporated, New York, N. Y., a corporation of New York Application August 13, 1948, Serial No. 44,074

5 Claims. (Cl. 171—95)

1

This invention relates to vacuum tube voltmeters, and more particularly to such a device for accurately measuring the peak voltage of high voltage pulses of low duty cycle.

In the past, measurements of low duty cycle pulses of high voltage by vacuum tube voltmeters have been subject to errors of several percent because of the high diode loading inherent in such measurements. An attempt has been made to use "slide-back" vacuum tube voltmeters in order to reduce the diode loading but because of the critical manual adjustment necessary to produce a null reading on the microammeters provided to indicate correct bucking voltage bias, the percentage of error has not been appreciably reduced. The old "slide-back" vacuum tube voltmeter is also heavy and occupies a large space.

Accordingly, it is one of the objects of the present invention to provide a completely automatic indication in a new "slide-back" vacuum tube voltmeter circuit which permits accurate measurements of pulses of low duty cycle.

With this and other objects in view, the invention comprises a vacuum tube voltmeter of a "slide-back" type wherein a small percentage of the measured voltage is used to automatically control a bucking voltage which is fed back into the input circuit in series opposition to the rectified test voltage. An alarm circuit is included in the system so that in the event of failure of the bucking voltage, an "error" lamp flashes indicating that the meter indications are in error.

Other objects and advantages will be apparent from the following detailed description when considered in conjunction with the attached circuit diagram.

Referring now to the drawing, an input jack 11 connected to a voltage source to be tested is also connected to a condenser 12 by means of a conductor 13. The other side of the condenser 12 is connected by a conductor 17 to a plate 14 of a diode rectifier tube 16. A cathode 18 of the diode rectifier tube 16 is connected to ground by a conductor 19. When a positive pulse of voltage is applied to the input jack 11, the plate 14 of the rectifier tube 16 will become positive so that tube 16 will conduct current from ground through conductor 19 and then through conductor 17, condenser 12 and conductor 13 to the voltage input jack 11. This current will charge condenser 12 to a voltage of approximately the magnitude of the peak positive value of the voltage under test applied to the input jack 11. When a negative voltage is applied to

2 the input jack 11, and then through the conductor 13 and the condenser 12 to the plate 14 of the tube 16, the tube 16 will not conduct as the plate will have a negative voltage impressed upon it. As the tube 16 will not conduct during negative pulses, the condenser 12 will only be charged during the positive pulses of the applied input voltage. This input circuit may be modified for measuring negative pulses, however, by inter-changing the position of the condenser 12 and the rectifier tube 16.

The negative terminal of condenser 12 is also connected to the negative terminal 22 of a direct current voltmeter 23 by a conductor 24. The positive terminal 26 of the direct current voltmeter 23 is connected through a conductor 27 to a resistor 28, one end of which is connected to ground. The voltage charge on condenser 12 will be applied in series with the resistor 28 and the voltmeter 23 by means of the circuit comprising the condenser 12, the conductor 24, the voltmeter 23, the conductor 27, the resistor 28 connected to ground, and through the internal impedance of the test source of the voltage to be measured, the jack 11, and the conductor 13.

Therefore, a portion of the voltage on condenser 12 will be applied between ground and the high potential end of the resistor 28. This voltage is also applied to a control grid 29 of a triode differential amplifier tube 31 by means of a conductor 32. A cathode 33 of the tube 31 is connected to ground through a conductor 34. A plate load resistor 36 is interconnected between a B supply 37 and a plate 38 of the tube 31 through a conductor 39. When a variation occurs in the voltage applied across the resistor 28, the variation in voltage is transmitted to the grid 29 through conductor 32 so that the grid bias voltage will also vary in accordance with the variation of the voltage of resistor 28. This variation in the bias on the grid 29 will vary the plate current which flows from ground through the conductor 34, through the tube 31, then through the conductor 39 to and through the resistor 36 to the B supply 37.

This variation in the plate current flowing through the plate resistor 36 will obviously cause a variation in the voltage applied across this resistor. This voltage variation is applied to a screen grid 41 of a radio frequency oscillator tube 42 through a conductor 43. By controlling the flow of plate current, the screen grid 41 serves to vary the magnitude of the radio frequency output from the oscillator tube 42.

One end of an inductance coil 44 is connected to a plate 45 of the tube 42 through a conductor 46 while the opposite end of the coil 44 is connected through a grid-leak condenser 47 to a control grid 49 of the tube 42. A condenser 50 is shunted across the terminals of the coil 44, and the B supply 37 is connected to a center tap on the coil 44. A grid-leak resistor 52 is connected between ground and the control grid 49 of the oscillator tube 42. The frequency of oscillation of the radio frequency oscillator tube 42 is adjusted to the self resonant frequency of a coil 53 by means of the proper choice of the design of the circuit elements 44 and 50. The grid-leak resistor 52 and the grid-leak condenser 47 serve to make the oscillator tube 42 self-starting in a manner which is well known in the art.

The coil 53 is inductively coupled to the coil 44 so that the output from the oscillator tube 42 will be impressed upon the coil 53. A coil 54 which is a tapped portion of the coil 53 is connected to a cathode 56 of a diode rectifier tube 57 through conductors 58 and 59.

One end of the coil 53 is connected to a plate 61 of the tube 57 through a condenser 62, which may be the same capacity as condenser 12, and a conductor 63. A conductor 64 connects the plate 61 of tube 57 to the negative terminal 22 of the voltmeter 23, and a conductor 66 connects the cathode 56 of the tube 57 to the positive terminal 26 of voltmeter 23.

When a positive pulse of voltage is induced in the coil 53 from the coil 44, it is applied across the rectifier tube 57 by means of the cathode 56, the conductors 58, 59, through the plate 61, the conductor 63 and the condenser 62. The positive pulse on the plate 61 will cause the tube 57 to conduct so that a condenser charging current will flow through a circuit comprising the tube 57, the conductor 63, the condenser 62, the coils 53 and 54 and the conductors 58 and 59 to charge the condenser 62 to the value of the peak positive voltage induced in the coil 53 by the coil 44. The direction of bow of the current will charge the condenser 62 in such a manner that a negative voltage will be impressed on the voltmeter terminal 22 through the conductor 64 and a positive voltage will be impressed on the voltmeter terminal 26 by means of the conductor 66. Therefore, the voltmeter 23 will indicate the magnitude of the voltage rectified by the diode rectifier tube 57.

The voltage charging the condenser 62 will serially oppose the voltage charging the condenser 12 through the circuit comprising the input jack 11, the conductor 13, the condenser 12, the conductors 24 and 64, the condenser 62, the coils 53 and 54, the conductors 58, 66 and 27, the resistor 28 to ground, and finally the return through the internal impedance of the source of the voltage to be measured. The aforementioned circuit also discloses that any difference between the voltages charging the condenser 62 and the voltage charging the condenser 12 will be applied across the terminal of the resistor 28.

This difference or "error" voltage is used to energize a visible alarm system which comprises a neon discharge lamp 67 and a condenser 68 which are connected in parallel between the conductor 32 and ground. When the "error" voltage exceeds a certain value, the condenser 68 will discharge through neon lamp 67 to indicate that the "error" voltage is above a certain predetermined level. This level is primarily determined by the breakdown voltage of the neon discharge tube 67.

From the foregoing detailed description, it is believed that the general operation of the apparatus will now be understood. The application of a positive pulse to be measured at the jack 11 will cause the diode rectifier tube 16 to conduct thus charging the condenser 12 to the peak positive value of the voltage to be measured. The negative voltage from the condenser 12 will be applied through the conductor 24, the voltmeter 23 and the conductor 27 to the resistor 28. This negative voltage is then conducted to the grid 29 of the tube 31 by the conductor 32 so that the voltage on the grid 29 will decrease in value. This reduction in the grid potential will serve to decrease the value of the plate current flowing from ground through the tube 31 and the plate resistor 36 to the B supply 37. This decrease in the plate current will increase the potential of the low potential end of the resistor 36 so that an increased voltage will be applied to the screen grid 41 through the conductor 43.

The increase in the screen grid potential will cause the tube 42 to emit a larger plate current so that the magnitude of the radio frequency output will be increased. This increase in output is coupled to the diode rectifier tube 57 by means of the mutually coupled coils 44, 54, and 53. The positive pulses of the voltage induced from the oscillator coil 44 will be rectified by the tube 57 and used to charge the condenser 62 to the value of the positive peak value of the oscillator induced voltage. This value of voltage is indicated on the voltmeter 23.

Any difference between the voltage to be measured which is applied across the terminals of the condenser 12, and the voltage charging the condenser 62, which value is indicated by voltmeter 23, will be applied across the terminals of the resistor 28. This difference, or "error" voltage will continue to energize the tubes 31, 42 and 57 in a manner heretofore described until the "error" voltage has reached a very low value which will be insufficient to change the plate current of tube 31. At this time, the voltage indicated on voltmeter 23 will be a very accurate indication of the voltage which is to be measured.

It is to be understood that the above described arrangement is simply illustrative of the application of the principles of the invention and that numerous other arrangements may be readily devised by those skilled in the art which will embody the principles of the invention and fall within the spirit and scope thereof.

What is claimed is:

1. An electrical measuring device comprising a constant radio frequency oscillator of variable magnitude output having a screen grid, a diode rectifier inductively coupled to the output of said oscillator for providing a first D. C. voltage, an indicating means connected across the terminals of the diode rectifier, a test input circuit including a diode rectifier connected to the indicating means for impressing a second D. C. voltage in opposition to the first D. C. voltage, signalling means responsive to the differential in the first and second D. C. voltages for indicating voltage differentials above a predetermined level, and a triode differential amplifier coupled to the screen grid and responsive to said voltage difference for the purpose of controlling the magnitude of the oscillator output.

2. An electrical measuring device comprising a constant frequency oscillator of variable magnitude output having a screen grid, rectifying means coupled to the oscillator for providing a first voltage, an input circuit including rectifying means for providing a test voltage in series opposition to the first voltage, an indicating means shunted across the source of the first voltage for measuring the magnitude thereof, and voltage responsive means energized by the difference in voltage between the first voltage and the test voltage which is coupled to the screen grid of the oscillator to control the magnitude of the output therefrom.

3. A device for measuring alternating current voltage comprising an indicating means, an input condenser coupled to the indicating means, a rectifier connected to the input condenser for charging said condenser with voltage of a particular polarity, a constant frequency oscillator having a control element for varying the magnitude of oscillator output, a second condenser charged with voltage of a particular polarity by the oscillator and connected across the terminals of the indicating device, said input and second condensers interconnected in polarity opposition to provide a voltage differential, and means for applying the voltage differential to the control element for regulating the magnitude of the output of the oscillator so as to reduce the voltage differential.

4. A device for measuring alternating current voltage comprising an indicating means, an input condenser coupled to the indicating means, a rectifier connected to the input condenser for charging said condenser with voltage of a particular polarity, a constant frequency oscillator, a second condenser charged with voltage of a particular polarity by the oscillator and connected across the terminals of the indicating device, said input and second condensers interconnected in polarity opposition to provide a voltage differential, signalling means responsive to visually indicate a voltage differential over a predetermined level, and means responsive to the voltage differential for regulating the oscillator so as to reduce the voltage differential.

5. A device for measuring alternating current voltage comprising a radio frequency oscillator having an output tank coil, a first condenser inductively coupled to the output coil, a first rectifier connected to the first condenser for charging the first condenser with a first voltage of a particular polarity, an indicating means connected in parallel with said condenser for measuring the amplitude of the charge thereon, a second condenser, a second rectifier connected to said second condenser to charge the second condenser with an applied voltage to be measured, said second condenser connected to the first condenser in series opposition, to produce a voltage differential between the first voltage and the voltage to be measured, and means for applying said voltage differential to the radio frequency oscillator to vary the magnitude of the oscillatory energy induced in the tank coil by said oscillator.

HOWARD H. ARNOLD.

REFERENCES CITED

The following references are of record in the file of this patent:

UNITED STATES PATENTS

| Number | Name | Date |
| --- | --- | --- |
| 2,136,682 | Gilbert | Nov. 15, 1938 |
| 2,147,446 | Koch | Feb. 14, 1939 |
| 2,190,743 | Vance | Feb. 20, 1940 |
| 2,214,915 | Wehrlin | Sept. 17, 1940 |
| 2,437,449 | Ames et al. | Mar. 9, 1948 |

FOREIGN PATENTS

| Number | Country | Date |
| --- | --- | --- |
| 237,991 | Switzerland | June 15, 1945 |
| 313,208 | Great Britain | June 10, 1929 |